US011689088B2

(12) United States Patent
Garrett, IV

(10) Patent No.: US 11,689,088 B2
(45) Date of Patent: Jun. 27, 2023

(54) MOVABLE PERMANENT MAGNET STATOR ELECTRIC MOTOR

(71) Applicant: Robert Willoughby Garrett, IV, Fairfax Station, VA (US)

(72) Inventor: Robert Willoughby Garrett, IV, Fairfax Station, VA (US)

( * ) Notice: Subject to any disclaimer, the term of this patent is extended or adjusted under 35 U.S.C. 154(b) by 374 days.

(21) Appl. No.: 16/947,671

(22) Filed: Aug. 12, 2020

(65) Prior Publication Data

US 2022/0052590 A1    Feb. 17, 2022

(51) Int. Cl.
| | |
|---|---|
| *H02K 23/04* | (2006.01) |
| *H02K 1/17* | (2006.01) |
| *H02K 7/08* | (2006.01) |
| *H02K 23/16* | (2006.01) |
| *H02K 7/14* | (2006.01) |
| *F04D 25/06* | (2006.01) |

(52) U.S. Cl.
CPC ............... *H02K 23/04* (2013.01); *H02K 1/17* (2013.01); *H02K 7/088* (2013.01); *H02K 7/14* (2013.01); *H02K 23/16* (2013.01); *F04D 25/06* (2013.01); *H02K 2213/09* (2013.01)

(58) Field of Classification Search
CPC ......... F04D 19/002; F04D 25/06; H02K 1/17; H02K 2213/09; H02K 23/04; H02K 23/16; H02K 53/00; H02K 7/088; H02K 7/14
See application file for complete search history.

(56) References Cited

U.S. PATENT DOCUMENTS

| | | | |
|---|---|---|---|
| 1,977,950 | A | 10/1934 | Morhard |
| 2,748,334 | A | 5/1956 | Miller |
| 2,881,338 | A | 4/1959 | Banning |
| 3,602,786 | A | 8/1971 | Izhelya et al. |
| 4,408,139 | A | 10/1983 | Schwarzler |
| 4,774,448 | A | 9/1988 | Yoshitomi |
| 6,737,778 | B2 | 5/2004 | Daikoku et al. |
| 7,888,904 | B2 | 2/2011 | Mularcik |

(Continued)

FOREIGN PATENT DOCUMENTS

| | | | | |
|---|---|---|---|---|
| JP | 4020675 B2 | * | 12/2007 | ............. H02K 5/225 |
| WO | WO-2005053139 A1 | * | 6/2005 | ............. H02K 11/21 |

OTHER PUBLICATIONS

JP-4020675-B2, All pages, Terminal Connection Structure of Electric Motor With Reduction Mechanism. (Year: 2007).*

(Continued)

*Primary Examiner* — Naishadh N Desai
(74) *Attorney, Agent, or Firm* — Squire Patent Consulting & IP Law LLC; Brendan E. Squire

(57) ABSTRACT

An electric motor with a movable permanent magnet stator is disclosed. The electric motor includes a rotor with an armature having a plurality of windings about the armature. A plurality of stator magnets are disposed about the rotor. The plurality of stator magnets a selectively positionable between a proximal position, in close proximity to the rotor, and a distal position, away from the rotor. An actuator is coupled to the plurality of stator magnets, the actuator operable to position the plurality of stator magnets between the proximal position and the distal position. The output of the electric motor is controlled by moving the stator magnets towards and away from rotor, rather than applying varying amounts of electricity to the rotor.

16 Claims, 3 Drawing Sheets

(56) References Cited

U.S. PATENT DOCUMENTS

| | | |
|---|---|---|
| 7,990,008 B2 | 8/2011 | Yoshida et al. |
| 8,511,235 B2 | 8/2013 | Fukukawa |
| 9,800,105 B2 | 10/2017 | Nigo et al. |
| 10,050,504 B2 | 8/2018 | Yim et al. |
| 10,411,532 B2 | 9/2019 | Lee et al. |
| 2008/0236915 A1 | 10/2008 | Schulze et al. |
| 2008/0238232 A1 | 10/2008 | Bando et al. |
| 2010/0213778 A1* | 8/2010 | Knutson ................ H02K 53/00 310/154.02 |

OTHER PUBLICATIONS

WO-2005053139-A1, All pages, Brushless Permanent Magnet Wheel Motor With Variable Axial Rotor/Stator Alignment. (Year: 2005).*

* cited by examiner

MOVABLE PERMANENT MAGNET STATOR ELECTRIC MOTOR

BACKGROUND OF THE INVENTION

The present invention relates to electric motors, and more particularly to apparatus and methods of improving the efficiency of electric motors.

The invention solves the problem of lack of efficiency in electric motors there by also solving the lack of efficacy in batteries. Existing batteries and motors are powered by large amounts of electricity. This results in motors to need more batteries which causes more weight to be added. When weight is added there is the need for more power but can only be achieved by more batteries.

Existing electric motors require large amounts of electricity with little reaction to the change. Since permanent magnets are multiplied by the electricity to get the total torque with little permanent magnets when more electricity is used there is less of a reaction.

As can be seen, there is a need for an electric motor and method of operating and controlling the same that improves efficiency of the motor.

SUMMARY OF THE INVENTION

In one aspect of the present invention, an electric motor is disclosed. The electric motor includes a rotor having an elongate shaft. A commutator disposed at a first end of the elongate shaft. An armature disposed proximal to a second end of the elongate shaft. A plurality of windings about the armature in communication with the commutator. A plurality of stator magnets are disposed about the rotor. The plurality of stator magnets are selectively positionable between a proximal position, in close proximity to the rotor, and a distal position, away from the rotor. An actuator is coupled to the plurality of stator magnets. The actuator is operable to position the plurality of stator magnets between the proximal position and the distal position.

In some embodiments, the actuator is a fluid actuator. In other embodiments, the actuator is an electro-mechanical actuator.

In some embodiments, the plurality of stator magnets are formed in a semi-circular arc about the rotor.

In other embodiments, a plurality of bearings rotationally support the rotor.

In yet other embodiments, a plurality of rotors arranged in a linear alignment. The plurality of stator magnets are disposed about each of the plurality of rotors. The actuator may selectively control a bank of the plurality of stator magnets. Each bank corresponding to one of the plurality of rotors.

In additional embodiments, an electrical source may be selectively applied to the commutator. A plurality of fixed stator magnets may also be disposed about the armature.

The motor may also include an output shaft and a turbine fan attached to the output shaft.

In other aspects of the invention, an electric motor is disclosed. The electric motor has a rotor with an armature and a plurality of windings in the armature. A plurality of stator magnets are moveably disposed relative to the rotor. An actuator is coupled to the plurality of stator magnets. The actuator is operable to selectively position the plurality of stator magnets between a proximal position, imparting a maximum magnetic force on the rotor, and a distal position, imparting a minimum magnetic force on the rotor. A magnetic field may be alternately disposed about the rotor.

In some embodiments, a plurality of rotors arranged in a linear alignment. The plurality of stator magnets are disposed about each of the plurality of rotors.

In other embodiments, the actuator selectively controls a bank of the plurality of stator magnets, each bank corresponding to one of the plurality of rotors.

In yet other aspects of the invention, a method of controlling an electric motor is disclosed. The electric motor has an armature and a plurality of windings about the armature. A stator includes a plurality of magnets. The method includes selectively positioning the stator between a proximal position, imparting a maximum magnetic force on the armature, and a distal position, imparting a minimum magnetic force on the armature.

The method may also include applying a current to the plurality windings to impart a magnetic field in the armature.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides an apparatus and method for improving the efficiency of electric motors. The electric motor of the present invention includes a variable positioned stator magnet to increase the power output of the electric motor. The stator magnet is movable from a position in close proximity to the windings 24 of the rotor 16, with a maximum magnetic force, to inches away with a minimal magnetic force. Aspects of the current invention permit the use of stronger permanent magnets, which provide an increase in the turning force of the electric motor while requiring small amounts of electricity. The electric motor of the present invention can provide thousands of more Newtons torque, allowing for use of the motor in aerospace and other high torque applications.

Figure 1:
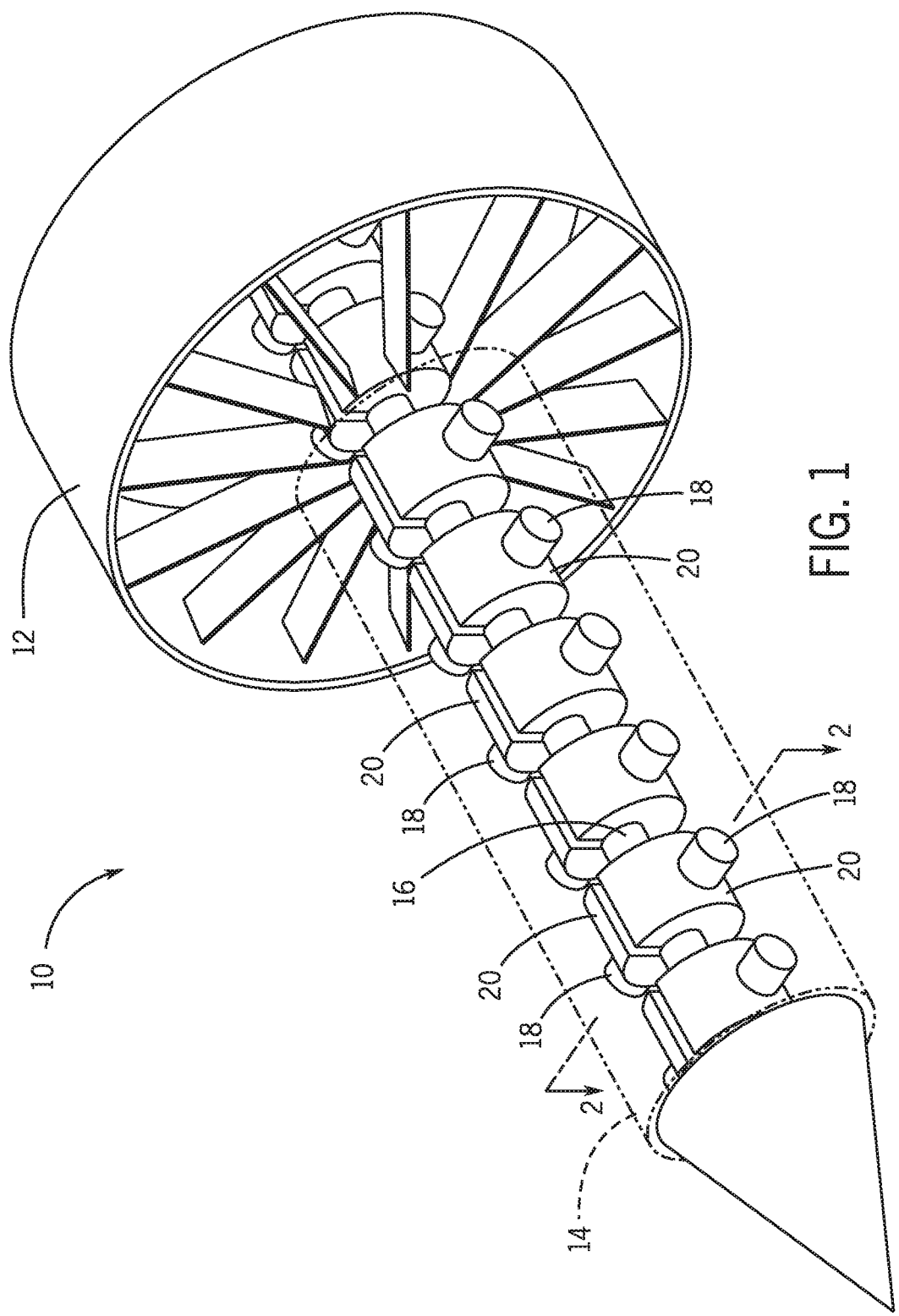
FIG. 1 is a front perspective view of movable stator electric motor.
Figure 2:
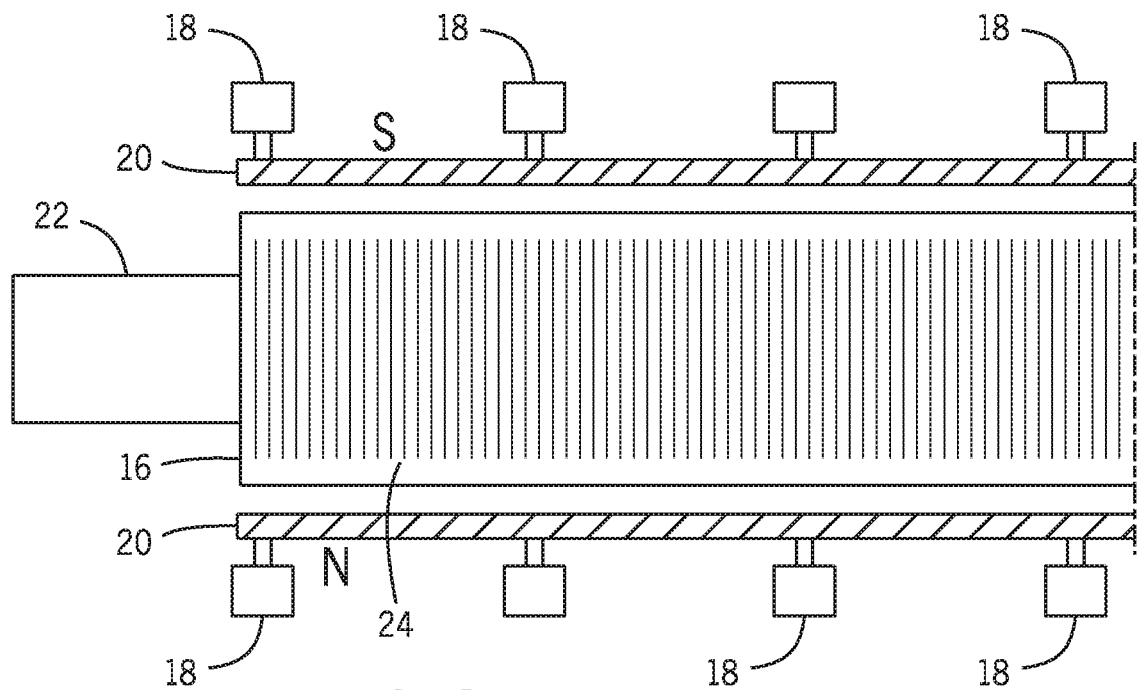
FIG. 2 is a schematic top plan view showing the movable stator electric motor in a first mode.
Figure 3:
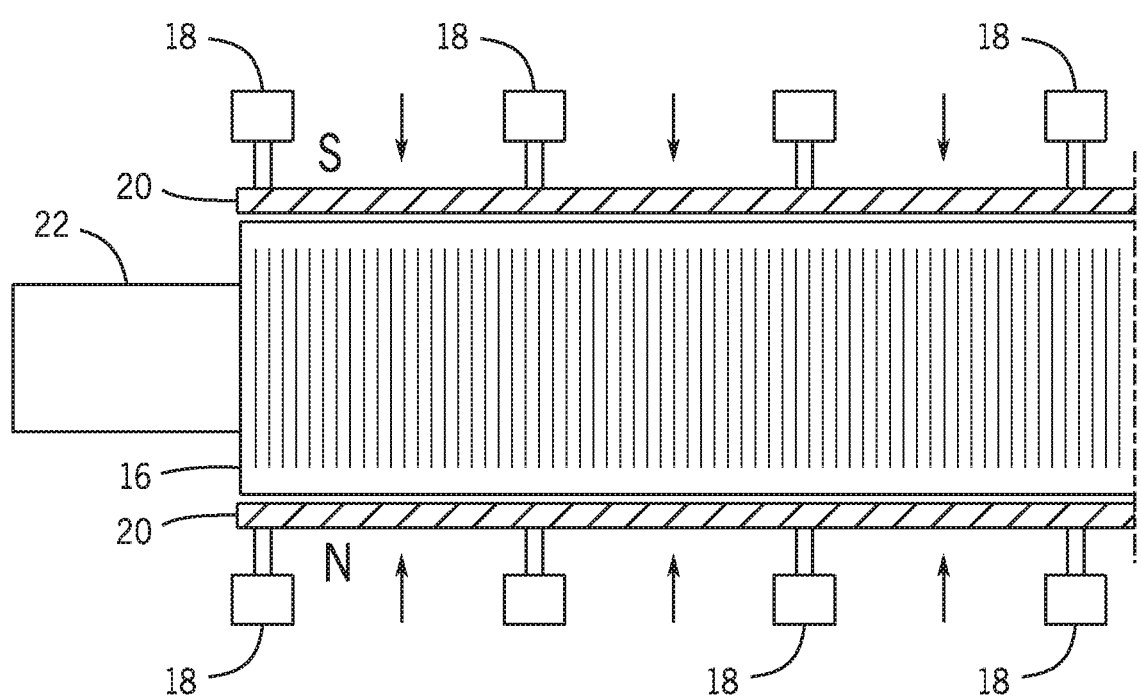
FIG. 3 is a schematic top plan view similar to FIG. 2, showing the movable stator electric motor in a second mode.
Figure 4:
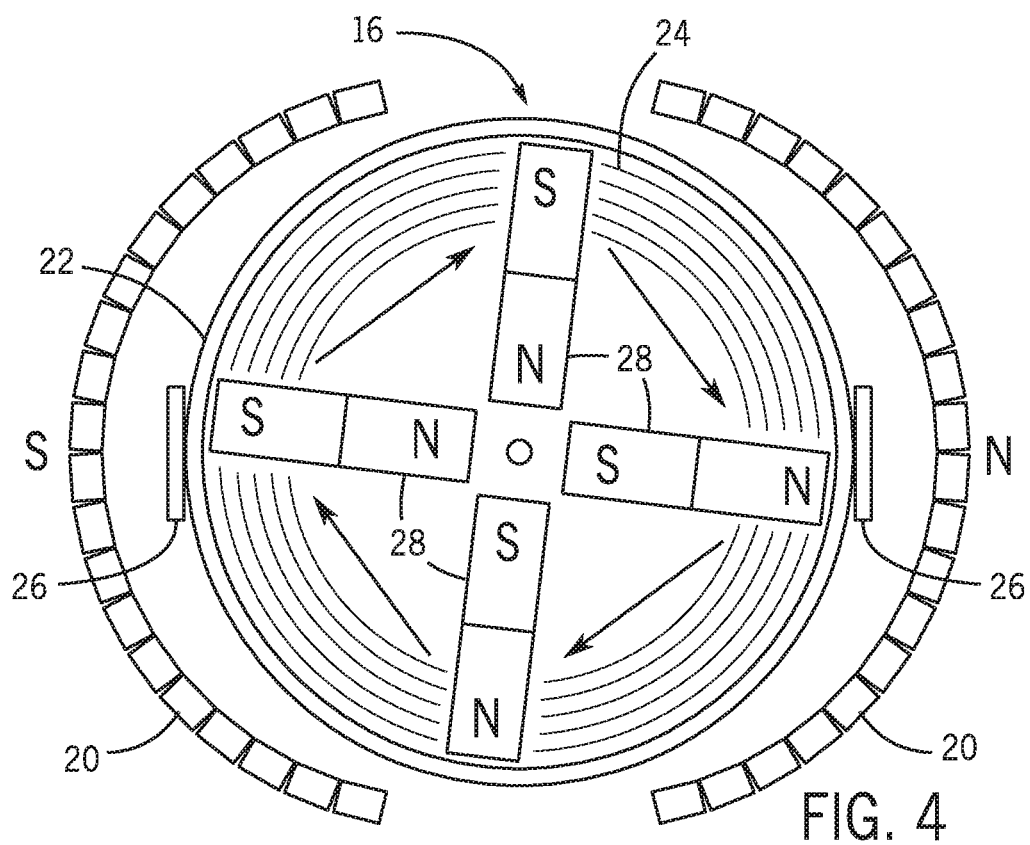
FIG. 4 is a schematic front view showing the movable stator electric motor in the first mode.
Figure 5:
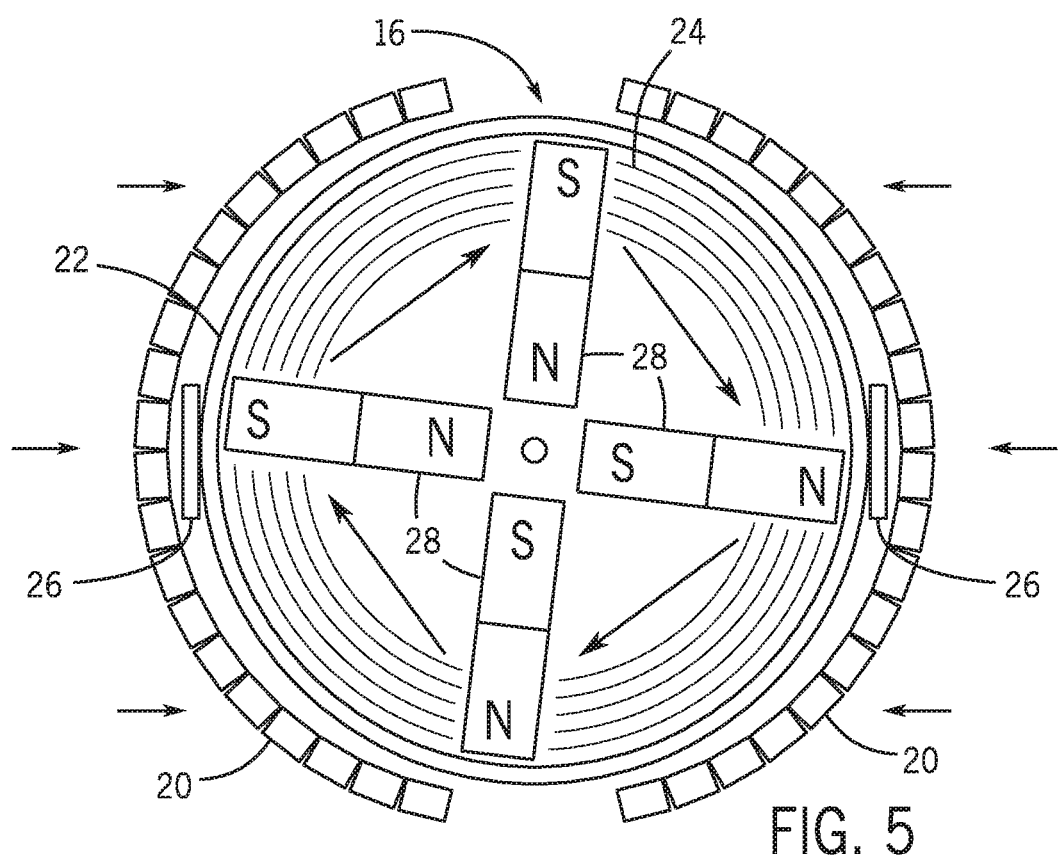
FIG. 5 is a schematic front view showing the movable stator electric motor in the second mode.

A non-limiting example of a movable stator electric motor 10 according to aspects of the present invention is shown in reference to the drawings of FIGS. 1-5. An output of the movable stator electric motor 10 includes a connection to an application requiring motive power of the motor 10, such as a turbine fan 12. The movable stator electric motor 10 is contained within a casing 14, depicted by broken lines. A rotor 16 extends along a longitudinal axis of the movable stator electric motor 10. The rotor 16 may be rotationally supported by a plurality of bearings, not shown for simplicity of understanding the more salient features of the invention.

At least one actuator 18, such as a fluid actuator, an electro-mechanical actuator, and the like, selectively positions a plurality of stator magnets 20 between a position proximal the rotor 16 and a position distal the rotor 16. Each of the plurality of stator magnets 20 may be formed in a semi-circular cylindrical shape to partially surround the rotor 16. The plurality of stator magnets 20 may also be disposed in a semi-circular array about the rotor 16. As will be appreciated, the movable stator electric motor 10 may also include a plurality of stationary magnets, not shown, for operation in a conventional manner.

As with conventional electric motors, a commutator bar 22 may be positioned on a shaft of the rotor 16. A plurality of windings 24 are carried on an armature of the rotor and are in electrical contact with a plurality of lands disposed about the commutator bar 22. A plurality of brushes 26 are urged in electrical contact with the lands of the commutator bar 22. The rotor 16 also carries a plurality of magnets 28 with configured with an alternating polarity around the rotor 16.

In essence, the operating principles of the movable stator electric motor 10 are the same to those of conventional electric motors, that is, how the motor creates a turning force or its torque. However, the strength of the movable stator electric motor 10 is substantially enhanced. The difference in the movable stator electric motor 10 is how that torque is provided. Instead of only using electricity and small amounts of magnetic force, as in a conventional electric motor, in the movable stator electric motor 10 it is the other way around. The movable stator magnets 20 positionally adjust, relative to the armature of the rotor 16, to change the torque of the movable stator electric motor 10.

The movable stator electric motor 10 of the present invention provides a new motor which is highly efficient and is capable of providing the same reliability, but with much greater usefulness. Since the movable stator electric motor 10 is more efficient it can be used on a range of different industries pioneering new eras in those industries.

The movable stator electric motor 10 of the invention requires a fraction of the energy and provides a higher output. Conventional motors are reliant on electricity for producing torque, thus requiring more energy to obtain a higher torque output. However, in the movable stator electric motor 10 selective positioning of the moveable stator magnets 20 relative to the rotor 16, between a maximum attractive magnetic force to a minimum attractive magnetic force, control of the torque of the motor 10 is provided without reliance on additional electric energy to the motor 10.

Likewise, because the movable stator magnets 20 are positionable to a minimum attractive magnetic force position, significantly stronger movable stator magnets 20 may be employed, while minimizing electrical energy requirements to start the motor 10. By utilizing stronger stator magnets 20, the movable stator electric motor 10 can rely on the energy of the stator magnets 20, rather than electricity. By selectively positioning stator magnets 20 between the proximal and distal positions, the output of the motor 10 may be controlled. Control of the motor 10 may also be augmented by use of electricity as in a conventional motor.

As will be appreciated, movable stator electric motor 10 would still need a quantity of electricity to provide a current to the windings 24 within the armature of the rotor 16. The electricity may be provided by a battery source, a generator coupled to the rotor 16, or an external source of electrical power.

In a non-limiting example, the stator magnets 20 may be formed as an array of 1000 1"×1" N52 magnets, which are selectively positionable to impart a motive force for the motor. Sixty Small Hydraulic arms may provide the actuators 18 for selectively positioning the stator magnets 20, to move the stator magnets 20 proximal and distal to the rotor 16. Ten 12"×2" armatures with 5" coils and associated windings 24 may be disposed along the rotor 16. The rotor 16 may be dimensioned to 30" length×6" diameter. Twenty 2"×2" brushes 26 are paired with each of the ten armatures. The actuator 18 selectively controls a bank of the plurality of movable stator magnets 20. Each bank of the plurality of movable stator magnets 20 corresponding to one of the plurality of rotors 16. The foregoing may be carried within a motor frame 14, with electrical wiring connecting the electrical parts of the motor 10. A battery may be provided to power to the motor 10.

Theoretically, the foregoing motor 10 would be able to produce over 100,000 newtons meters of torque. The equation for finding the torque is called the Lorentz Force Equation: (Force in newtons=Charge in Coulombs (q)*velocity in m/s (v)*Field in Teslas (B)*sin θ)

According to the Lorentz equation for the above described motor, the theoretical force obtained is 200,000 Newtons=10 Coulombs*43 M/S*465 Teslas*1 (90 degres). The 200,000 Newtons are multiplied by 0.5 because the radius is 6 inches which is ½ of a foot. Hence, the theoretical torque of the above described movable stator motor 10 is 100,000 Newtons of torque, a variant which would theoretically be capable of powering the world's largest aircraft.

While described in the context of a conventional electric motor with the plurality of movable stator magnets 20 surrounding the windings 24 of the rotor 16, the principles of the present invention are equally applicable in electric motors where the coils surround a fixed stator magnet. In this case, a plurality of stator magnets 20 may be radially extensible from a distal position, imparting a minimum magnetic force on the windings 24, and a proximal position, imparting a maximum magnetic force on the windings 24.

It should be understood, of course, that the foregoing relates to exemplary embodiments of the invention and that modifications may be made without departing from the spirit and scope of the invention as set forth in the following claims.

What is claimed is:

1. An electric motor, comprising:
    a rotor having an elongate shaft, a commutator disposed at a first end of the elongate shaft, an armature disposed proximal to a second end of the elongate shaft, and a plurality of windings about the armature in communication with the commutator;
    a plurality of stator magnets radially disposed about the rotor, the plurality of stator magnets radially positionable between a proximal position in close proximity to the rotor and a distal position away from the rotor; and
    an actuator coupled to the plurality of stator magnets, the actuator operable to radially position the plurality of stator magnets between the proximal position and the distal position.

2. The electric motor of claim 1, wherein the actuator is a fluid actuator.

3. The electric motor of claim 1, wherein the actuator is an electro-mechanical actuator.

4. The electric motor of claim 1, wherein the plurality of stator magnets are formed in a semi-circular arc about the rotor.

5. The electric motor of claim 1, further comprising:
a plurality of bearings rotationally support the rotor.

6. The electric motor of claim 1, further comprising:
a plurality of rotors arranged in a linear alignment; and
the plurality of stator magnets radially disposed about each of the plurality of rotors.

7. The electric motor of claim 6, wherein the actuator selectively controls a bank of the plurality of stator magnets, each bank corresponding to one of the plurality of rotors.

8. The electric motor of claim 1, further comprising:
an electrical source selectively applied to the commutator.

9. The electric motor of claim 1, further comprising:
a plurality of fixed stator magnets disposed about the armature.

10. The electric motor of claim 1, further comprising:
an output shaft; and
a turbine fan attached to the output shaft.

11. An electric motor, comprising:
a rotor having an armature and a plurality of windings about the armature;
a plurality of stator magnets radially moveably disposed relative to the rotor; and
an actuator coupled to the plurality of stator magnets, the actuator operable to radially position the plurality of stator magnets between a proximal position, imparting a maximum magnetic force on the rotor, and a distal position, imparting a minimum magnetic force on the rotor.

12. The electric motor of claim 11, further comprising:
a magnetic field may be alternately disposed about the rotor.

13. The electric motor of claim 12, further comprising:
a plurality of rotors arranged in a linear alignment; and
the plurality of stator magnets are disposed about each of the plurality of rotors.

14. The electric motor of claim 13, wherein the actuator selectively controls a bank of the plurality of stator magnets, each bank corresponding to one of the plurality of rotors.

15. A method of controlling an electric motor having an armature, a plurality of windings about the armature, and a stator comprising a plurality of magnets, the method comprising:
radially positioning the plurality of stator magnets between a proximal position relative to the armature, imparting a maximum magnetic force on the armature, and a distal position relative to the armature, imparting a minimum magnetic force on the armature.

16. The method of claim 15, further comprising:
applying a current to the plurality windings to impart a magnetic field in the armature.

* * * * *